United States Patent
Gou et al.

(10) Patent No.: US 9,577,775 B2
(45) Date of Patent: Feb. 21, 2017

(54) SYNCHRONIZATION TRACK REFERENCE SIGNAL TRANSMISSION PROCESSING, RECEIVING PROCESSING METHOD AND APPARATUS

(71) Applicant: ZTE Corporation, Shenzhen, Guangdong Province (CN)

(72) Inventors: Wei Gou, Shenzhen (CN); Shuqiang Xia, Shenzhen (CN); Zhisong Zuo, Shenzhen (CN); Bo Dai, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 172 days.

(21) Appl. No.: 14/400,132

(22) PCT Filed: May 2, 2013

(86) PCT No.: PCT/CN2013/075069
§ 371 (c)(1),
(2) Date: Nov. 10, 2014

(87) PCT Pub. No.: WO2013/166930
PCT Pub. Date: Nov. 14, 2013

(65) Prior Publication Data
US 2015/0117314 A1    Apr. 30, 2015

(30) Foreign Application Priority Data
May 11, 2012    (CN) .......................... 2012 1 0146568

(51) Int. Cl.
H04J 11/00    (2006.01)
H04L 5/00    (2006.01)
(Continued)

(52) U.S. Cl.
CPC ........... *H04J 11/005* (2013.01); *H04B 7/2656* (2013.01); *H04J 1/065* (2013.01); *H04J 11/0073* (2013.01);
(Continued)

(58) Field of Classification Search
CPC ..................... H04W 56/0035; H04W 56/0015; H04W 7/2656; H04L 5/001; H04L 5/0096; H04L 5/0098; H04J 11/0076; H04J 11/0073; H04J 1/065; H04J 11/005; H04B 7/2656
See application file for complete search history.

(56) References Cited

U.S. PATENT DOCUMENTS

| 2009/0175179 A1* | 7/2009 | Stewart | ............... H04L 27/2613 370/252 |
| 2012/0014330 A1* | 1/2012 | Damnjanovic | ......... H04L 5/001 370/329 |

(Continued)

FOREIGN PATENT DOCUMENTS

WO    WO2011082671    *    7/2011

OTHER PUBLICATIONS

Extended European Search Report for International Application No. 13787818.7, dated Dec. 4, 2015. (8 pages).
Search Strategy for Extended European Search Report for International Application No. 13787818.7, dated Dec. 4, 2015. (1 page).
NEC Group, "Configurable Time-Frequency locations for PSS/SSS signals on the NCT," TSG-RAN WG1 #68Bis, Mar. 26-30, Jeju, Korea. Agenda Item:7.2.2.2 (2012) (7 pages).
(Continued)

Primary Examiner — Omer S Mian
(74) Attorney, Agent, or Firm — Clark & Elbing LLP (57) ABSTRACT

Provided are a synchronization track reference signal transmission processing, receiving processing method and apparatus. According to the transmission processing method, a base station configures, for a new carrier, subframe pattern information used for a synchronization track reference signal (STRS), wherein the subframe pattern information is used for describing at least one subframe for transmitting the
(Continued)

A base station configuring subframe pattern information of STRS for a new carrier, wherein the subframe pattern information is used for describing at least one subframe for transmitting the STRS in a radio frame — S102

The base station transmitting the configured subframe pattern information to UE — S104

STRS in a radio frame; and the base station transmits the configured subframe pattern information to user equipment. By applying the technical solution, the technical problems of being unable to transmit the STRS in a new carrier since there is not technical solution regarding how to transmit the STRS in the related technologies, etc. are solved, thereby achieving the transmission of the STRS in the new carrier.

19 Claims, 1 Drawing Sheet

(51) Int. Cl.
    *H04J 1/06*     (2006.01)
    *H04W 56/00*     (2009.01)
    *H04B 7/26*     (2006.01)

(52) U.S. Cl.
    CPC ............ *H04J 11/0076* (2013.01); *H04L 5/001* (2013.01); *H04L 5/0098* (2013.01); *H04W 56/0015* (2013.01); *H04W 56/0035* (2013.01)

(56) References Cited

U.S. PATENT DOCUMENTS

| | | | | |
|---|---|---|---|---|
| 2012/0270555 A1* | 10/2012 | Wei | ........................ | H04W 48/08 |
| | | | | 455/450 |
| 2012/0300641 A1* | 11/2012 | Chen | ..................... | H04L 1/0026 |
| | | | | 370/241 |
| 2012/0315859 A1* | 12/2012 | Lee | ......................... | H04J 11/005 |
| | | | | 455/67.13 |
| 2013/0114535 A1* | 5/2013 | Ng | .................... | H04W 72/0446 |
| | | | | 370/329 |
| 2014/0226582 A1* | 8/2014 | Zeng | .................... | H04B 7/0626 |
| | | | | 370/329 |

OTHER PUBLICATIONS

New POSTCOM, "CSI-RS based RRM measurement for additional carrier type," 3GPP TSG-RAN WG1 #68bis, Mar. 26-30, Jeju, Korea. Agenda Item:7.2.2.1 (2012) (4 pages).

Huawei et al., "Time and frequency synchronization performance evaluation," 3GPP TSG-RAN WG1 #68bis, Mar. 26-30, Jeju, Korea. Agenda Item:7.2.2.1 (2012) (8 pages).

\* cited by examiner

SYNCHRONIZATION TRACK REFERENCE SIGNAL TRANSMISSION PROCESSING, RECEIVING PROCESSING METHOD AND APPARATUS

TECHNICAL FIELD

The disclosure relates to the field of communications, and in particular to a synchronization track reference signal transmission processing, receiving processing method and apparatus.

BACKGROUND

With the development of mobile communication industries and the constant growth of requirements for mobile data services, people have increasingly higher requirements for rate and quality of service (QoS for short) of mobile communications. Based on the above reasons, before large-scale commercial use of the third generation (3G) mobile communications, the research and development for the next mobile communication system have been started, and a typical one is the long-term evolution (LTE for short) project started by the 3rd generation partnership project (3GPP for short). The highest frequency spectrum bandwidth which may be provided by the LTE system is 20 MHz (megahertz). With further evolution of networks, as an advanced system of the LTE, long-term evolution advance (LTE-A for short) may provide frequency spectrum bandwidth as high as 100 MHz and support more flexible communications with a higher quality, and meanwhile, the LTE-A system has a good backward compatibility. There are a plurality of component carriers (CC for short) in the LTE-A system. One LTE terminal may only work on a certain backward compatible CC, while an LTE-A terminal with a stronger capability may perform transmission on multiple CCs simultaneously. That is to say, the terminal implementing the LTE-A transmits and receives data on multiple component carriers simultaneously, thereby achieving the object of improving bandwidth. This technique is called as multi-carrier aggregation technique.

The multi-carrier aggregation technique is supported in the LTE-A system, and larger bandwidth for data transmission is achieved by the multi-carrier aggregation. There are 5 subordinate carriers of a base station at most, and these carriers are referred to as component carriers, all of which are carriers with backward compatibility so as to support user equipment (UE for short) working based on an earlier LTE release. A base station may configure multiple component carriers for one piece of UE, and choose some or all of the component carriers to be activated for the UE, and the activated component carriers may provide data transmission for the UE.

In the researches at present stage, on the basis of multi-carrier aggregation technique, the LTE R11 (release 11) stage proposes new requirements in terms of frequency spectrum resource utilization rate, network power saving and inter-cell interference suppression. In order to achieve this object, a new carrier type is proposed at present, which is applied by virtue of the carrier aggregation technique. The new carrier has an outstanding characteristic, i.e. backward compatibility does not need to be considered in design, in which more new techniques may be applied. For example, the definition for the new carrier in the current LTE R11 is, needing to be applied in pair with at least one compatible carrier, and cell-specific reference signals (CRS for short) of LTE R8 are not configured in the new carrier so as to avoid severe CRS interference at the cell edge of neighbouring cells, especially the CRS interference between macro cells and micro cells in the heterogeneous network scenario (HetNet for short). However, not configuring the LTE R8 CRS in the new carrier faces with the problem that there is no reference signal used for synchronization tracking in the new carrier. Up to the current new carrier discussion, some companies propose not configuring primary synchronization signal/secondary synchronization signal (PSS/SSS) transmission in some new carriers (e.g. a synchronization new carrier) and using PSS/SSS resources for transmitting data, and that UE keeps synchronization with the new carrier by means of the compatible carrier. As regards some new carriers (e.g. non-synchronization new carriers), the PSS/SSS is still configured. A reference signal mainly for synchronization track is introduced in the new carrier, which is referred to as a synchronization track reference signal (STRS for short). The current STRS transmission period is 5 ms. As regards the problem of whether to apply a full-bandwidth method or a sub-band method (transmitting in N resource blocks (RB for short) in the middle of the carrier, where N is an integer greater than or equal to 6) to transmit the STRS, it is still under discussion, and there is no determined transmission method at present. That is to say, there is still no technical solution regarding how to perform STRS transmission in the related art, thereby resulting in being unable to transmit the STRS in a new carrier. Aiming at the problem above in the related technologies, no effective solution has been presented.

SUMMARY

As regards the technical problems of being unable to transmit the STRS in a new carrier since there is not technical solution regarding how to transmit the STRS in the related technologies, etc., the embodiments of the disclosure provide a synchronization track reference signal transmission processing and receiving processing method and apparatus to solve at least the technical problem above.

According to one embodiment of the disclosure, a synchronization track reference signal transmission processing method is provided. The method includes: a base station configuring, for a new carrier, subframe pattern information used for a synchronization track reference signal (STRS), wherein the subframe pattern information is used for describing at least one subframe for transmitting the STRS in a radio frame; and the base station transmitting the configured subframe pattern information to user equipment (UE).

The base station transmitting the configured subframe pattern information to the UE includes: the base station transmitting designated signalling to the UE via a paired compatible carrier of the new carrier, wherein the designated signalling carries the subframe pattern information.

The subframe pattern information includes one of the following: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

When the base station transmits the configured subframe pattern information to the UE, the method further includes: when the subframe pattern information is the initial subframe offset, the base station and the UE using a pre-appointed fixed period to transmit the STRS.

The subframe pattern combination is one of the following: a combination of subframes #0 and #5 bearing the STRS; a combination of subframes #1 and #6 bearing the STRS; a combination of subframes #2 and #7 bearing the STRS; a combination of subframes #3 and #8 bearing the STRS; and a combination of subframes #4 and #9 bearing the STRS.

In a time-division duplex (TDD) mode, the subframe pattern combination is determined by the following means: determining an uplink-downlink configuration used by the new carrier; and determining the subframe pattern combination for transmitting the STRS in the uplink-downlink configuration from a plurality of pre-defined subframe pattern combinations according to pre-set rules.

The pre-set rules include: when the uplink-downlink configuration is 0, the subframe combination bearing the STRS being subframe#0 and subframe#5, or subframe#1 and subframe#6; when the uplink-downlink configuration is 1, the subframe combination bearing the STRS being subframe#0 and subframe#5, or subframe#1 and subframe#6, or subframe#4 and subframe#9; when the uplink-downlink configuration is 2, the subframe combination bearing the STRS being subframe#0 and subframe#5, or subframe#1 and subframe#6, or subframe#3 and subframe#8, or subframe#4 and subframe#9, or subframe#0, subframe#3, subframe#6 and subframe#9; when the uplink-downlink configuration is 3, the subframe combination bearing the STRS being subframe#0 and subframe#5, or subframe#2 and subframe#6; when the uplink-downlink configuration is 4, the subframe combination bearing the STRS being subframe#0 and subframe#5, or subframe#2 and subframe#6, or subframe#4 and subframe#9; when the uplink-downlink configuration is 5, the subframe combination bearing the STRS being subframe#0 and subframe#5, or subframe#2 and subframe#6, or subframe#3 and subframe#8, or subframe#4 and subframe#9; and when the uplink-downlink configuration is 6, the subframe combination bearing the STRS being subframe#0 and subframe#5, or subframe#2 and subframe#6.

When the fixed period is 10 ms, transmitting the configured subframe pattern information to the UE includes: transmitting the subframe identification to the UE.

The initial subframe offset includes one of the following forms: a serial number of an initial subframe for bearing the STRS in a radio frame, and an offset from a first subframe spacing forward by a pre-determined number of subframes in the radio frame.

A value range of the initial subframe offset is 0, 1, 2, 3 and 4, or a value set of the initial subframe offset is a value set composed of one or more of 0, 1, 2, 3 and 4.

In a TDD mode, the value range or value set is determined using an uplink-downlink configuration of the new carrier:

when the uplink-downlink configuration is 0, the value range being 0 and 1, or the value set being a set composed of one or more of 0 and 1;

when the uplink-downlink configuration is 1, the value range being 0, 1 and 4, or the value set being a set composed of one or more of 0, 1 and 4;

when the uplink-downlink configuration is 2, the value range being 0, 1, 3 and 4, or the value set being a set composed of one or more of 0, 1, 3 and 4;

when the uplink-downlink configuration is 3, the value range being 0 and 1, or the value set being a set composed of one or more of 0 and 1;

when the uplink-downlink configuration is 4, the value range being 0, 1 and 4, or the value set being a set composed of one or more of 0, 1 and 4;

when the uplink-downlink configuration is 5, the value range being 0, 1, 3 and 4, or the value set being a set composed of one or more of 0, 1, 3 and 4; and when the uplink-downlink configuration is 6, the value range being 0 and 1, or the value set being a set composed of one or more of 0 and 1;

wherein 0, 1, 3 and 4 respectively represent the first, second, fourth and fifth subframe in the radio frame, and corresponding subframe numbers are #0, #1, #3 and #4 respectively.

The value of the initial subframe offset is equal to a remainder after dividing a subframe number by the fixed period, wherein the fixed period is a fixed period used for transmitting the STRS and pre-appointed by the base station and the UE.

When the subframe pattern combination is identified by an index number, the base station transmitting the configured subframe pattern information to the UE includes: the base station transmitting the index number to the UE.

After the base station transmits the acquired subframe pattern information to UE, the method further includes: when the UE determines that the subframe pattern information is null, the UE judging that no primary synchronization signal (PSS) and secondary synchronization signal (SSS) are transmitted in the new carrier, and the UE determining that the new carrier and the compatible carrier are synchronous in time and frequency; and when the UE determines that the subframe pattern information is non-null, the UE judging that the PSS/SSS is transmitted in the new carrier, and the UE receiving the PSS/SSS in the new carrier and executing a synchronization operation with the new carrier.

The base station transmitting the designated signalling to the UE via the paired compatible carrier of the new carrier includes: the base station transmitting an RRCConnectionReconfiguration message or measConfig message to the UE via the paired compatible carrier of the new carrier, wherein the RRCConnectionReconfiguration message or measConfig message carries the designated signalling.

Before the base station transmits the acquired subframe pattern information to the UE, the method further includes: configuring the same subframe pattern information in radio frames of the same new carrier.

Before the base station acquires the subframe pattern information about the STRS in the radio frame, the method further includes: when configuring the STRS for neighbouring cells, configuring different subframe pattern information for respective cells which are neighbouring cells with each other.

According to another embodiment of the disclosure, a synchronization track reference signal parameter transmission processing apparatus is provided. The apparatus is located in a base station and includes: a configuration component, adapted to configure, for a new carrier, subframe pattern information used for a synchronization track reference signal (STRS), wherein the subframe pattern information is used for describing at least one subframe for transmitting the STRS in a radio frame; and a transmission component, adapted to transmit the configured subframe pattern information to user equipment (UE).

The transmission component is adapted to transmit designated signalling to the UE via a paired compatible carrier of the new carrier, wherein the designated signalling carries the subframe pattern information.

The subframe pattern information includes one of the following: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

The subframe pattern combination is one of the following: a combination of subframes #0 and #5 bearing the STRS; a combination of subframes #1 and #6 bearing the STRS; a combination of subframes #2 and #7 bearing the STRS; a combination of subframes #3 and #8 bearing the STRS; and a combination of subframes #4 and #9 bearing the STRS.

The configuration component is adapted to, in a time-division duplex (TDD) mode, determine the subframe pattern information by the following means: determining an uplink-downlink configuration used by the new carrier; and determining the subframe pattern combination for transmitting the STRS in the uplink-downlink configuration from a plurality of pre-defined subframe pattern combinations according to pre-set rules.

The initial subframe offset includes one of the following forms: a serial number of an initial subframe for bearing the STRS in a radio frame, and an offset from a first subframe spacing forward by a pre-determined number of subframes in the radio frame.

A value range of the initial subframe offset is 0, 1, 2, 3 and 4, or a value set of the initial subframe offset is a value set composed of one or more of 0, 1, 2, 3 and 4.

According to still another embodiment of the disclosure, a synchronization track reference signal receiving processing method is provided. The method includes: user equipment (UE) receiving subframe pattern information from a first carrier, and determining at least one transmission subframe of a synchronization track reference signal (STRS) in a second carrier according to the subframe pattern information, wherein the subframe pattern information is used for describing at least one subframe for transmitting the STRS in a radio frame, and the first carrier and the second carrier are the same or different.

When the first carrier and the second carrier are different, the first carrier is a paired carrier of the second carrier, wherein the first carrier is a backward compatible carrier, and the second carrier is a new carrier.

The subframe pattern information includes one of the following: an initial subframe offset of the at least one subframe for transmitting the STRS in the radio frame, a subframe pattern combination of at least one subframe for bearing the STRS, and subframe identification corresponding to the at least one subframe for bearing the STRS in a radio frame.

When the UE receives the subframe pattern information, the method further includes: when the subframe pattern information is the initial subframe offset, the UE and the base station using a pre-appointed fixed period to transmit the STRS.

The subframe pattern combination includes one of the following subframe combinations bearing the STRS: a combination of subframes #0 and #5 ; a combination of #1 and #6 ; a combination of subframes #2 and #7 ; a combination of subframes #3 and #8 ; and a combination of subframes #4 and #9.

In a time-division duplex (TDD) mode, the subframe pattern combination is determined by the following means: determining an uplink-downlink configuration used by the second carrier; and determining the subframe pattern combination for transmitting the STRS in the uplink-downlink configuration from a plurality of pre-defined subframe pattern combinations according to pre-set rules.

The pre-set rules include: when the uplink-downlink configuration is 0, the subframe combination bearing the STRS including: subframe#0 and subframe#5 , or subframe#1 and subframe#6 ; when the uplink-downlink configuration is 1, the subframe combination bearing the STRS including one of the following: subframe#0 and subframe#5 , subframe#1 and subframe#6 , and subframe#4 and subframe#9 ; when the uplink-downlink configuration is 2, the subframe combination bearing the STRS including one of the following: subframe#0 and subframe#5 , subframe#1 and subframe#6 , subframe#3 and subframe#8 , subframe#4 and subframe#9 , and subframe#0, subframe#3 , subframe#6 and subframe#9 ; when the uplink-downlink configuration is 3, the subframe combination bearing the STRS including one of the following: subframe#0 and subframe#5 , and subframe#2 and subframe#6 ; when the uplink-downlink configuration is 4, the subframe combination bearing the STRS including one of the following: subframe#0 and subframe#5 , subframe#2 and subframe#6 , and subframe#4 and subframe#9 ; when the uplink-downlink configuration is 5, the subframe combination bearing the STRS including one of the following: subframe#0 and subframe#5 , subframe#2 and subframe#6 , subframe#3 and subframe#8 , and subframe#4 and subframe#9 ; and when the uplink-downlink configuration is 6, the subframe combination bearing the STRS including one of the following: subframe#0 and subframe#5 , and subframe#2 and subframe#6.

The fixed period includes: 2 ms or 3 ms or 5 ms, or 2 ms and 3 ms appeared alternately.

The initial subframe offset includes one of the following forms: a serial number of an initial subframe for bearing the STRS in the radio frame, and an offset from a first subframe spacing forward by a pre-determined number of subframes in the radio frame.

A value range of the initial subframe offset is 0, 1, 2, 3 and 4, or the value set of the initial subframe offset is a value set composed of one or more of 0, 1, 2, 3 and 4.

In a TDD mode, the UE determines the value range or value set using an uplink-downlink configuration of the second carrier: when the uplink-downlink configuration is 0, the value range being 0 and 1, or the value set being a set composed of one or more of 0 and 1; when the uplink-downlink configuration is 1, the value range being 0, 1 and 4, or the value set being a set composed of one or more of 0, 1 and 4; when the uplink-downlink configuration is 2, the value range being 0, 1, 3 and 4, or the value set being a set composed of one or more of 0, 1, 3 and 4; when the uplink-downlink configuration is 3, the value range being 0 and 1, or the value set being a set composed of one or more of 0 and 1; when the uplink-downlink configuration is 4, the value range being 0, 1 and 4, or the value set being a set composed of one or more of 0, 1 and 4; when the uplink-downlink configuration is 5, the value range being 0, 1, 3 and 4, or the value set being a set composed of one or more of 0, 1, 3 and 4; and when the uplink-downlink configuration is 6, the value range being 0 and 1, or the value set being a set composed of one or more of 0 and 1; wherein 0, 1, 3 and 4 respectively represent the first, second, fourth and fifth subframe in the radio frame, and corresponding subframe numbers are #0, #1, #3 and #4.

The value of the initial subframe offset is equal to a remainder after dividing a subframe number by the fixed period, wherein the fixed period is a fixed period used for transmitting the STRS and pre-appointed by the base station and the UE.

After the UE receives the subframe pattern information, the method further includes: when the UE determines that the subframe pattern information is null, the UE judging that no primary synchronization signal (PSS) and secondary synchronization signal (SSS) are transmitted in the second carrier, and the UE determining that the second carrier and the compatible carrier are synchronous in time and frequency; and when the UE determines that the subframe pattern information is non-null, the UE judging that the PSS/SSS is transmitted in the second carrier, and the UE receiving the PSS/SSS in the second carrier and executing a synchronization operation with the second carrier.

According to still another embodiment of the disclosure, a synchronization track reference signal receiving processing apparatus is provided. The apparatus is located in user equipment (UE) and includes: a receiving component, adapted to receive subframe pattern information from a first carrier, wherein the subframe pattern information is used for describing at least one subframe for transmitting a synchronization track reference signal (STRS) in a radio frame; and a determination component, adapted to determine at least one transmission subframe of the STRS in a second carrier according to the subframe pattern information, wherein the first carrier and the second carrier are the same or different.

The determination component is adapted to, when the first carrier is a paired carrier of the second carrier, determine the transmission subframe of the STRS in the second carrier, wherein the first carrier is a backward compatible carrier, and the second carrier is a new carrier.

The receiving component is configured to, when the subframe pattern information includes one of the following, receive the subframe pattern information: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

According to the embodiments of the disclosure, by applying the technical means of configuring, at a base station, subframe pattern information used for describing at least one subframe for transmitting the STRS in a radio frame and transmitting same to UE, the technical problems of being unable to transmit the STRS in a new carrier since there is not technical solution regarding how to transmit the STRS in the related technologies, etc. are solved, thereby achieving the transmission of the STRS in the new carrier.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
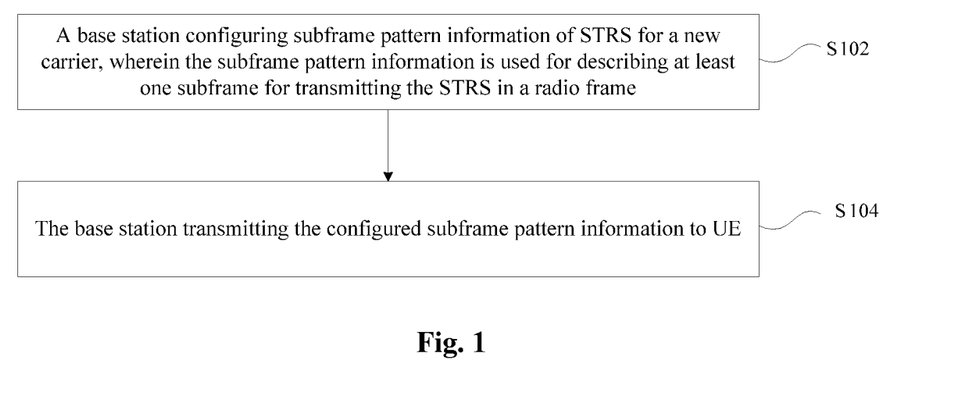
FIG. 1 is a flow chart of a synchronization track reference signal transmission processing method according to an embodiment of the disclosure.

FIG. 1 is a flow chart of a synchronization track reference signal transmission processing method according to an embodiment of the disclosure. As shown in FIG. 1, the method includes:

step S102, a base station configures STRS subframe pattern information for a new carrier, wherein the subframe pattern information is used for describing at least one subframe for transmitting the STRS in a radio frame; and step S104, the base station transmits the configured subframe pattern information to UE.

By means of the processing steps above, since a base station sends the UE the configured subframe pattern information used for describing at least one subframe for transmitting an STRS, on the basis of such processing solution, the STRS signal may be transmitted via a new carrier.

In step S104, there are various manners for the base station to transmit the configured subframe pattern information to the UE, e.g. this configured subframe pattern information may be transmitted via a user-defined message. In a preferred embodiment of the disclosure, the following manner may also be used: the base station transmits designated signalling to the UE via a paired compatible carrier of the new carrier, wherein the designated signalling carries the subframe pattern information, i.e. the subframe pattern information is transmitted to the UE via instruction signalling.

The subframe pattern information may include but do not limit to one of the following: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

When the base station transmits the configured subframe pattern information to UE and when the subframe pattern information is the initial subframe offset, the base station and the UE use a pre-appointed fixed period to transmit the STRS. In this way, using a fixed period to transmit the STRS may reduce signalling exchange between the base station and the UE, thereby saving signalling overhead.

Whether in a TDD mode or a frequency division duplex (FDD for short) mode, the subframe pattern combination may be any of the combination as follows: a combination of subframes #0 and #5 bearing the STRS; a combination of subframes #1 and #6 bearing the STRS; a combination of subframes #2 and #7 bearing the STRS; a combination of subframes #3 and #8 bearing the STRS; and a combination of subframes #4 and #9 bearing the STRS. In the FDD mode, the fixed period may be 5 ms.

In the TDD mode, there are also various subframe pattern combinations, e.g. the specific subframe pattern combination being used may be determined according to an uplink-downlink configuration. In such case, the following processing may be particularly used for implementation: in a time-division duplex (TDD for short) mode, the subframe pattern combination is determined by the following means: determining an uplink-downlink configuration used by the new carrier; and determining the subframe pattern combination for transmitting the STRS in the uplink-downlink configuration from a plurality of pre-defined subframe pattern combinations according to pre-set rules.

In the TDD mode above, the pre-set rules may be represented as the following forms:

when the uplink-downlink configuration is 0, the subframe combination bearing the STRS being subframe#0 and subframe#5, or subframe#1 and subframe#6;

when the uplink-downlink configuration is 1, the subframe combination bearing the STRS being subframe#0 and subframe#5, or subframe#1 and subframe#6, or subframe#4 and subframe#9;

when the uplink-downlink configuration is 2, the subframe combination bearing the STRS being subframe#0 and subframe#5, or subframe#1 and subframe#6, or subframe#3 and subframe#8, or subframe#4 and subframe#9, or subframe#0, subframe#3, subframe#6 and subframe#9;

when the uplink-downlink configuration is 3, the subframe combination bearing the STRS being subframe#0 and subframe#5, or subframe#2 and subframe#6;

when the uplink-downlink configuration is 4, the subframe combination bearing the STRS being subframe#0 and subframe#5, or subframe#2 and subframe#6, or subframe#4 and subframe#9;

when the uplink-downlink configuration is 5, the subframe combination bearing the STRS being subframe#0 and subframe#5, or subframe#2 and subframe#6, or subframe#3 and subframe#8, or subframe#4 and subframe#9; and when the uplink-downlink configuration is 6, the subframe combination bearing the STRS being subframe#0 and subframe#5, or subframe#2 and subframe#6.

When the appointed fixed period is 10 ms, at this moment, the method for transmitting the subframe identification to the UE achieves the transmission of the configured subframe pattern information to the UE.

The initial subframe offset includes one of the following forms: a serial number of an initial subframe for bearing the STRS in the radio frame, and an offset from a first subframe spacing forward by a pre-determined number of subframes in the radio frame.

The value range of the initial subframe offset is 0, 1, 2, 3 and 4, or the value set is a value set composed of one or more of 0, 1, 2, 3 and 4.

In a TDD mode, the value range or value set may be determined using an uplink-downlink configuration of the new carrier according to the following manners:

when the uplink-downlink configuration is 0, the value range being 0 and 1, or the value set being a set composed of one or more of 0 and 1, e.g. the set being {0}, {1}, or {0, 1};

when the uplink-downlink configuration is 1, the value range being 0, 1 and 4, or the value set being a set composed of one or more of 0, 1 and 4;

when the uplink-downlink configuration is 2, the value range being 0, 1, 3 and 4, or the value set being a set composed of one or more of 0, 1, 3 and 4;

when the uplink-downlink configuration is 3, the value range being 0 and 1, or the value set being a set composed of one or more of 0 and 1;

when the uplink-downlink configuration is 4, the value range being 0, 1 and 4, or the value set being a set composed of one or more of 0, 1 and 4;

when the uplink-downlink configuration is 5, the value range being 0, 1, 3 and 4, or the value set being a set composed of one or more of 0, 1, 3 and 4; and when the uplink-downlink configuration is 6, the value range being 0 and 1, or the value set being a set composed of one or more of 0 and 1;

wherein 0, 1, 3 and 4 respectively represent the first, second, fourth and fifth subframe in the radio frame, and corresponding subframe numbers are #0, #1, #3 and #4.

The value of the initial subframe offset may also be determined according to the following manner: the value of the initial subframe offset is equal to a remainder after dividing a subframe number by the fixed period, wherein the fixed period is a fixed period used for transmitting the STRS and pre-appointed by the base station and the UE.

When the subframe pattern combination is identified by an index number, at this moment, the base station may transmit the configured subframe pattern information to the UE by transmitting the index number to the UE.

In the related technologies, since whether the new carrier is a synchronization new carrier or a non-synchronization new carrier, the transmission at the base station side considers that the new carrier and the paired compatible carrier are transmitted simultaneously and are synchronous (being within an error specified by a standard protocol may also consider to be synchronous). However, after the new carrier and the paired compatible carrier experience air interface transmission, due to different carrier frequency bands, obstacle bypassing capabilities and the moving speed and direction of the UE, the two carriers originally transmitted by the base station simultaneously may not be synchronous in time with each other when arriving at the UE, and the frequency deviations are also different. However, when primary measurement is performed on the new carrier at the UE side, the UE side is not clear whether the new carrier and the paired compatible carrier are synchronous (they are synchronous at the base station side, but may be out-of-synchronous when arriving at the UE side), and the UE side is not clear whether itself is synchronous with the new carrier, nor whether the new carrier to be measured has transmitted a PSS/SSS. Thus, the UE needs to execute various possible flows to detect whether the UE is synchronous with the new carrier and detect whether the new carrier is configured with the PSS/SSS or STRS, such that the processing complexity at the UE side will increase. Thus, there is blindness of detecting the new carrier configuration at the UE side.

In order to solve the problem of blindness above, after the base station transmits the acquired subframe pattern information to the UE, the following processing process may also be performed.

When the UE determines that the subframe pattern information is null, the UE judges that no primary synchronization signal (PSS) and secondary synchronization signal (SSS) are transmitted in the new carrier, and the UE determines that the new carrier and the compatible carrier are synchronous in time and frequency; and when the UE determines that the subframe pattern information is non-null, the UE judges that the PSS/SSS is transmitted in the new carrier, and the UE receives the PSS/SSS in the new carrier and executes a synchronization operation with the new carrier.

There may be various manners for the base station to transmit the designated signalling to the UE via a paired compatible carrier of the new carrier. For example, the following manner may be used: the base station transmits an RRCConnectionReconfiguration message or measConfig message to the UE via the paired compatible carrier of the new carrier, wherein the RRCConnectionReconfiguration message or measConfig message carries the designated signalling.

In order to reduce the overhead for transmitting the subframe pattern information, the base station may configure the same subframe pattern information in radio frames of the same new carrier before transmitting the acquired subframe pattern information to the UE.

Currently, the STRS introduced in LTE R11 will still cause relatively large interference between neighbouring cells. Although such interference will only occur in a subframe bearing the STRS compared to the LTE R8 CRS, this interference is still introduced, which affects edge efficiency improvement. In addition, it is further specified that the STRS cannot be used for demodulating data, such that the ratio of the disadvantage to the advantage of the STRS decreases, and therefore the STRS is a problem needing to be solved. In order to avoid interference caused by the STRS at the neighbouring cell edge, before the base station acquires subframe pattern information about the synchronization track reference signal (STRS) in the radio frame, when configuring the STRS for neighbouring cells, different subframe pattern information may be configured for respective cells which are neighbouring cells with each other. Thus, the subframes bearing the STRS between neighbouring cells will not be the same, thereby being able to solve the interference problem above.

Figure 2:
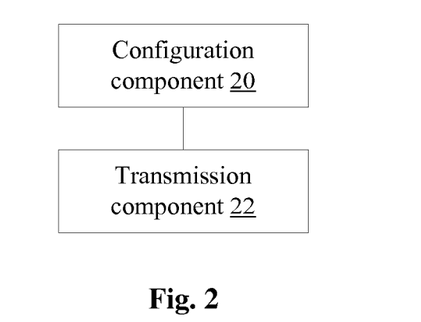
FIG. 2 is a structural block diagram of a synchronization track reference signal transmission processing apparatus according to an embodiment of the disclosure.

A synchronization track reference signal parameter transmission processing apparatus is also provided in this embodiment. The apparatus is located in the base station and used for implementing the embodiments and preferred embodiments above. What is described will not be repeated, and the components involved in the apparatus will be illustrated below. As used below, the term "component" is a combination of software and/or hardware which may implement pre-determined functions. Although the apparatus described in the following embodiments is implemented as software preferably, the implementation of hardware or a combination of software and hardware may also be possible and conceivable. FIG. 2 is a structural block diagram of a synchronization track reference signal transmission processing apparatus according to an embodiment of the disclosure. As shown in FIG. 2, the apparatus includes:

a configuration component 20, coupled with a transmission component 22, adapted to configure, for a new carrier, subframe pattern information used for an STRS, wherein the subframe pattern information is used for describing at least one subframe for transmitting the STRS in a radio frame; and the transmission component 22, adapted to transmit the configured subframe pattern information to UE.

By means of the processing components above in the synchronization track reference signal parameter transmission processing apparatus, since the configuration component 20 may configure subframe pattern information used for an STRS for a new carrier, and the transmission component 22 may be used to transmit the subframe pattern information to UE, the STRS signal may be transmitted via a new carrier.

In the described embodiment, the transmission component 22 may be further adapted to transmit designated signalling to the UE via a paired compatible carrier of the new carrier, wherein the designated signalling carries the subframe pattern information.

Being similar to that in the method embodiments above, the subframe pattern information includes one of the following: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

The subframe pattern combination is one of the following: a combination of subframes #0 and #5 bearing the STRS; a combination of subframes #1 and #6 bearing the STRS; a combination of subframes #2 and #7 bearing the STRS; a combination of subframes #3 and #8 bearing the STRS; and a combination of subframes #4 and #9 bearing the STRS.

The configuration component 20 is adapted to, in a TDD mode, determine subframe pattern information by the following means: determining an uplink-downlink configuration used by the new carrier; and determining the subframe pattern combination for transmitting the STRS in the uplink-downlink configuration from a plurality of pre-defined subframe pattern combinations according to pre-set rules.

The initial subframe offset includes one of the following forms: a serial number of an initial subframe for bearing the STRS in the radio frame, and an offset from a first subframe spacing forward by a pre-determined number of subframes in the radio frame.

The value range of the initial subframe offset is 0, 1, 2, 3 and 4, or the value set is a value set composed of one or more of 0, 1, 2, 3 and 4.

In particular implementations, the value range or value set of the subframe offset may be determined according to an uplink-downlink configuration:

when the uplink-downlink configuration is 0, the value range being 0 and 1, or the value set being a set composed of one or more of 0 and 1, e.g. the set being {0}, {1}, or {0, 1};

when the uplink-downlink configuration is 1, the value range being 0, 1 and 4, or the value set being a set composed of one or more of 0, 1 and 4;

when the uplink-downlink configuration is 2, the value range being 0, 1, 3 and 4, or the value set being a set composed of one or more of 0, 1, 3 and 4; and when the uplink-downlink configuration is 3, the value range being 0 and 1, or the value set being a set composed of one or more of 0 and 1;

when the uplink-downlink configuration is 4, the value range being 0, 1 and 4, or the value set being a set composed of one or more of 0, 1 and 4;

when the uplink-downlink configuration is 5, the value range being 0, 1, 3 and 4, or the value set being a set composed of one or more of 0, 1, 3 and 4; and when the uplink-downlink configuration is 6, the value range being 0 and 1, or the value set being a set composed of one or more of 0 and 1;

wherein 0, 1, 3 and 4 respectively represent the first, second, fourth and fifth subframe in the radio frame, and corresponding subframe numbers are #0, #1, #3 and #4.

The base station and the UE appoint the value range or value set corresponding to each uplink-downlink configuration, then take a value for a parameter. The base station and the UE first determine an uplink-downlink configuration, and then further determine a subframe bearing the STRS according to the parameter value.

The value of the initial subframe offset may also be determined according to the following manner: the value of the initial subframe offset is equal to a remainder after dividing a subframe number by the fixed period, wherein the fixed period is a fixed period used for transmitting the STRS and pre-appointed by the base station and the UE.

As regards the manner whereby the base station and the UE use a pre-appointed subframe pattern combination to describe the subframe bearing the STRS, the preferred subframe pattern of each configuration regarding different TDD uplink-downlink configurations is given by means of numerous simulations and evaluations.

When the uplink-downlink configuration is 0, the subframe combination bearing the STRS is subframes #0 and #5 , or #1 and #6;

when the uplink-downlink configuration is 1, the subframe combination bearing the STRS is subframes #0 and #5 , or #1 and #6 , or #4 and #9;

when the uplink-downlink configuration is 2, the subframe combination bearing the STRS is subframes #0 and #5 , or #1 and #6 , or #3 and #8 , or #4 and #9 , or #0, #3, #6 and #9;

when the uplink-downlink configuration is 3, the subframe combination bearing the STRS is subframes #0 and #5 , or #2 and #6;

when the uplink-downlink configuration is 4, the subframe combination bearing the STRS is subframes #0 and #5 , or #2 and #6 , or #4 and #9;

when the uplink-downlink configuration is 5, the subframe combination bearing the STRS is subframes #0 and #5 , or #2 and #6 , or #3 and #8 , or #4 and #9 ; and when the uplink-downlink configuration is 6, the subframe combination bearing the STRS is subframes #0 and #5 , or #2 and #6.

The base station and the UE number each subframe pattern combination regarding each uplink-downlink configuration, and the UE is notified of the subframe bearing the STRS by means of notifying a number. The base station and the UE first determine an uplink-downlink configuration, then further determine a corresponding subframe pattern combination according to the number.

This embodiment also provides a synchronization track reference signal receiving processing method, including: UE receiving subframe pattern information from a first carrier, and determining at least one transmission subframe of a synchronization track reference signal (STRS) in a second carrier according to the subframe pattern information, wherein the subframe pattern information is used for describing at least one subframe for transmitting the STRS in a radio frame, and the first carrier and the second carrier may be the same or different.

When the first carrier and the second carrier are different, the first carrier is a paired carrier of the second carrier, wherein the first carrier is a backward compatible carrier, and the second carrier is a new carrier.

The subframe pattern information includes one of the following: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

When the UE receives the subframe pattern information, the method further includes: when the subframe pattern information is the initial subframe offset, the UE and the base station using a pre-appointed fixed period to transmit the STRS.

The subframe pattern combination includes one of the following subframe combinations bearing the STRS: a combination of subframes #0 and #5 ; a combination of #1 and #6 ; a combination of subframes #2 and #7 ; a combination of subframes #3 and #8 ; and a combination of subframes #4 and #9 . In a time-division duplex (TDD) mode, the subframe pattern combination is determined by the following means: determining an uplink-downlink configuration used by the second carrier; and determining the subframe pattern combination for transmitting the STRS in the uplink-downlink configuration from a plurality of pre-defined subframe pattern combinations according to pre-set rules.

The pre-set rules include: when the uplink-downlink configuration is 0, the subframe combination bearing the STRS including: subframe#0 and subframe#5 , or subframe#1 and subframe#6 ; when the uplink-downlink configuration is 1, the subframe combination bearing the STRS including one of the following: subframe#0 and subframe#5 , subframe#1 and subframe#6 , and subframe#4 and subframe#9 ; when the uplink-downlink configuration is 2, the subframe combination bearing the STRS including one of the following: subframe#0 and subframe#5 , subframe#1 and subframe#6 , subframe#3 and subframe#8 , subframe#4 and subframe#9 , and subframe#0, subframe#3 , subframe#6 and subframe#9 ; when the uplink-downlink configuration is 3, the subframe combination bearing the STRS including one of the following: subframe#0 and subframe#5 , and subframe#2 and subframe#6 ; when the uplink-downlink configuration is 4, the subframe combination bearing the STRS including one of the following: subframe#0 and subframe#5 , subframe#2 and subframe#6 , and subframe#4 and subframe#9 ; when the uplink-downlink configuration is 5, the subframe combination bearing the STRS including one of the following: subframe#0 and subframe#5 , subframe#2 and subframe#6 , subframe#3 and subframe#8 , and subframe#4 and subframe#9 ; and when the uplink-downlink configuration is 6, the subframe combination bearing the STRS including one of the following: subframe#0 and subframe#5 , and subframe#2 and subframe#6.

In the described embodiment, the fixed period includes: 2 ms or 3 ms or 5 ms, or 2 ms and 3 ms appeared alternately.

The initial subframe offset includes one of the following forms: a serial number of an initial subframe for bearing the STRS in the radio frame, and an offset from a first subframe spacing forward by a pre-determined number of subframes in the radio frame.

The value range of the initial subframe offset is 0, 1, 2, 3 and 4, or the value set is a value set composed of one or more of 0, 1, 2, 3 and 4.

In a TDD mode, the UE determines the value range or value set using an uplink-downlink configuration of the second carrier: when the uplink-downlink configuration is 0, the value range being 0 and 1, or the value set being a set composed of one or more of 0 and 1; when the uplink-downlink configuration is 1, the value range being 0, 1 and 4, or the value set being a set composed of one or more of 0, 1 and 4; when the uplink-downlink configuration is 2, the value range being 0, 1, 3 and 4, or the value set being a set composed of one or more of 0, 1, 3 and 4; when the uplink-downlink configuration is 3, the value range being 0 and 1, or the value set being a set composed of one or more of 0 and 1; when the uplink-downlink configuration is 4, the value range being 0, 1 and 4, or the value set being a set composed of one or more of 0, 1 and 4; when the uplink-downlink configuration is 5, the value range being 0, 1, 3 and 4, or the value set being a set composed of one or more of 0, 1, 3 and 4; and when the uplink-downlink configuration is 6, the value range being 0 and 1, or the value set being a set composed of one or more of 0 and 1; wherein 0, 1, 3 and 4 respectively represent the first, second, fourth and fifth subframe in the radio frame, and corresponding subframe numbers are #0, #1, #3 and #4.

The value of the initial subframe offset is equal to a remainder after dividing a subframe number by the fixed period, wherein the fixed period is a fixed period used for transmitting the STRS and pre-appointed by the base station and the UE.

After the UE receives the subframe pattern information, the method further includes: when the UE determines that the subframe pattern information is null, the UE judging that no primary synchronization signal (PSS) and secondary synchronization signal (SSS) are transmitted in the second carrier, and the UE determining that the second carrier and the compatible carrier are synchronous in time and frequency; and when the UE determines that the subframe pattern information is non-null, the UE judging that the PSS/SSS is transmitted in the second carrier, and the UE receiving the PSS/SSS in the second carrier and executing a synchronization operation with the second carrier.

This embodiment also provides a synchronization track reference signal receiving processing apparatus, located in UE, including: a receiving component, adapted to receive subframe pattern information from a first carrier, wherein the subframe pattern information is used for describing at least one subframe for transmitting a synchronization track reference signal (STRS) in a radio frame; and a determination component, adapted to determine at least one transmission subframe of the STRS in a second carrier according to the subframe pattern information, wherein the first carrier and the second carrier may be the same or different.

The determination component is adapted to, when the first carrier is a paired carrier of the second carrier, determine the transmission subframe of the STRS in the second carrier, wherein the first carrier is a backward compatible carrier, and the second carrier is a new carrier.

The receiving component is adapted to, when the subframe pattern information includes one of the following, receive the subframe pattern information: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame.

In order to better understand the embodiments above, detailed description will be made below in combination with relevant drawings and embodiment 1. In embodiment 1, while providing a synchronization track reference signal transmission processing solution, the interference problem at the neighbouring cell edge position of a carrier (the carrier and the cell are equivalent) can be solved, and UE is helped to clearly learn the PSS/SSS and STRS configuration situation in the new carrier.

Embodiment 1

This embodiment proposes an STRS configuration and signalling method. The method is applied in a new carrier, and in particular, a base station and UE appoint to use a fixed period regarding STRS transmission, e.g. fixed as 2 ms, 3 ms, 5 ms or 10 ms. Here, considering the object of the STRS, according to numerous simulations and evaluations, it is considered that the optimal choice is being fixed as 5 ms regarding the LTE system, which may be provide a balance between performance and overhead. On the basis of the fixed period, the base station further configures a subframe pattern of the STRS in a radio frame via signalling, and needs to transmit the signalling to the UE via a carrier paired with a carrier bearing the STRS. The subframe pattern herein is used for describing which subframe or subframes bears/bear the STRS in a radio frame or carrier.

There may be two implementation methods in particular.

In a first method, a subframe offset parameter is added on the basis of the fixed period of the STRS to describe the subframe pattern, and for more details, please see the subsequent description.

Figure 3:
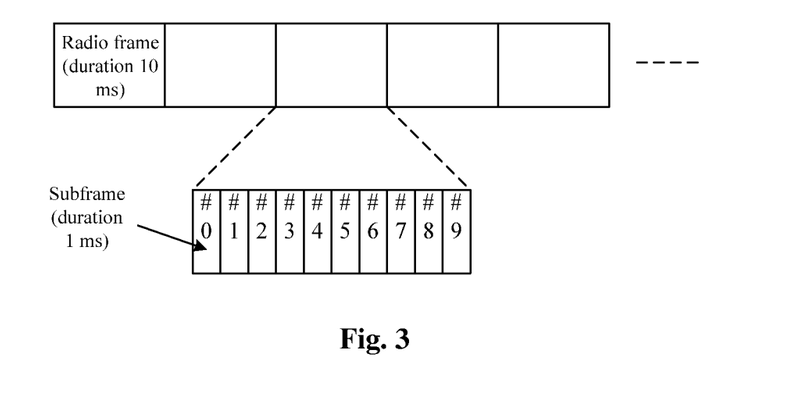
FIG. 3 is a schematic diagram of a radio frame and a subframe in the LTE standard according to an embodiment of the disclosure.

In a second method, on the basis of the fixed period of the STRS, the at least one subframe for bearing the STRS in a radio frame is further made as various pattern combinations (limited combinations), and then different pattern combinations are numbered and the a specific number is notified to the UE, and please see the description below for particular pattern combinations. In the described embodiment, the subframe patterns bearing the STRS in the radio frames of the same carrier are the same before the expiration of the signalling, and this is for simplifying the design of signalling, which is good for decreasing signalling overhead. Of course, if the signalling overhead is not taken into consideration, differential subframe patterns bearing the STRS may also be configured in different radio frames of the same carrier, such that more subframe patterns may be provided, enabling a more flexible configuration. The relationship between a radio frame and a subframe involved in this embodiment may refer to FIG. 3.

In this embodiment, the base station and the UE may appoint to indirectly and implicitly notify, via the signalling, the UE of the primary and secondary synchronization configuration in the new carrier. For example, the UE receives subframe pattern signalling (i.e. the signalling above) of the STRS in a radio frame transmitted by the base station, and the UE determines a subframe pattern bearing the STRS in a new carrier; and the UE considers that the carrier bearing the STRS is configured to have transmitted the PSS/SSS, then the UE considers that the UE itself is not synchronous with the carrier bearing the STRS, and then the UE needs to receive the PSS/SSS from the carrier bearing the STRS and accomplish the synchronization with the carrier rather than considering itself being synchronous with the carrier bearing the STRS. On the contrary, if the signalling is found to be null in the information received by the UE (i.e. not configuring to transmit the signalling), then the UE considers that the new carrier is not configured with the PSS/SSS, and the UE considers that as long as the UE itself keeps synchronous with the compatible carrier paired with the new carrier, the synchronization with the new carrier is achieved at the same time. Apparently, this indirect and implied information may help the UE clarify the subsequent execution flow, otherwise the UE needs to detect whether the PSS/SSS exists in the new carrier, and then selects a corresponding flow for execution according to the detection conclusion. Apparently, the technical means above can simplify the complexity of the flow at the UE side.

The first method above is described as follow. The base station and the UE appoint to transmit the STRS using a fixed period, such that STRS period information does not need signalling transmission, which reduces signalling overhead. Then, a parameter is introduced to describe the subframe pattern bearing the STRS, wherein the parameter describes the position of the first subframe bearing the STRS in a radio frame, so that a series of subframes bearing the STRS in the radio frame can be determined according to the first subframe and the period information. This configuration may be further applied to other radio frames, that is, the subframes bearing the STRS in all the radio frames in the carrier are the same before the signalling expiration. The consideration of constraining the subframe offset in the radio frame herein may simplify the design, which is advantageous for simplifying the problem and reducing signalling overhead. It is easily achievable to configure different subframe patterns bearing the STRS for different radio frames, which provides more subframe patterns for the STRS and improves the flexibility. For example, if it is not allowed that different radio frames may use different subframe patterns, then on the basis of the fixed STRS period, it may be appointed that the first radio frame used by an even-numbered radio frame and the first radio frame used by an odd-numbered radio frame are successively adjacent to each other backwards, e.g. the signalling for describing the subframe pattern bearing the STRS is used for notifying the UE of the first subframe bearing the STRS in an even-numbered radio frame, and it is default that an odd-numbered radio frame uses the next subframe. Furthermore, in such method the bit number of overhead needed by the signalling may be determined according to the period. For example, when the period is 5 ms, it is specified that 3 bits are used for describing first subframes bearing the STRS in 5 different radio subframes, e.g. using "000" to represent subframe#0, "001" to represent subframe#1, "010" to represent subframe#2, "011" to represent subframe#3 , and "100" to represent subframe#4 . For example, this embodiment also supports the following method. The base station and the UE appoint to use the STRS of multiple fixed periods, for example, the base station and the UE appoint that the STRS with the period being 5 ms is used in an even-numbered radio frame, and the STRS with the period being 3 ms is used in an odd-numbered radio frame, and then the base station respectively configure a parameter for describing the subframe pattern in the radio frame for the UE regarding the two radio frames, e.g., a parameter for describing the first subframe bearing the STRS in a corresponding radio frame. Of course, it may also be supported that the base station and the UE appoint to use the STRS with the period being 5 ms within N (N is a fixed value) continuous radio frames, and use the STRS with the period being 3 ms within subsequent n (n is a fixed value and n may be equal to N) continuous radio frames, in which method, the signalling above may continue to be used according to the previous method. N continuous radio frames may correspond to system information modification periods, i.e. within each system information modification period, STRS with different fixed periods appointed may be used.

The second method above is particularly described as follows. The base station and the UE appoint to use the STRS with a fixed period, formulate different pattern combinations of subframes bearing the STRS in a radio frame, and notify the UE of combination information. In an embodiment of the disclosure, when the method of notifying the subframe pattern combination is used, if the pattern combination cannot strictly comply with the appointed fixed period of STRS transmission, the pattern combination is taken as the criterion, and the pattern combination herein is obtained according to numerous simulations and evaluations.

In the LTE FDD, this embodiment provides the following pattern combinations according to simulations and evaluations, as shown in Tables 1-4:

TABLE 1

Subframe pattern combination with STRS period being 5 ms

| Serial number index | Pattern combination |
|---|---|
| 1 | #0, #5 |
| 2 | #1, #6 |
| 3 | #2, #7 |
| 4 | #3, #8 |
| 5 | #4, #9 |

TABLE 2

Subframe pattern combination with STRS period being 2 ms

| Serial number index | Pattern combination |
|---|---|
| 1 | #0, #2, #4, #6, #8 |
| 2 | #1, #3, #5, #7, #9 |

TABLE 3

Subframe pattern combination with STRS period being 3 ms

| Serial number index | Pattern combination |
|---|---|
| 1 | #0, #3, #6, #9 |
| 2 | #1, #4, #1 |
| 3 | #2, #5, #8 |
| 4 | #3, #6, #9 |

TABLE 4

Pattern combination with STRS period being 4 ms

| Serial number index | Pattern combination |
|---|---|
| 1 | #0, #4, #8 |
| 2 | #1, #5, #9 |
| 3 | #2, #6 |
| 4 | #3, #7 |

For example, when the appointed period of the base station and the UE is 5 ms, the base station then further notifies that the serial number is 2 via STRS subframe pattern configuration signalling, in this case, the actual subframes bearing the STRS in the radio frame are #1 and #5 , and the same subframe pattern is used in all the radio frames of the carrier. For example, when the appointed STRS period of the base station and the UE is 3 ms, the base station then further notifies that the serial number is 2 via STRS subframe pattern configuration signalling, in such a case, the actual subframes bearing the STRS in the radio frame are #1, #4 and #7 , and the same subframe pattern is used in all the radio frames of the carrier.

In this embodiment, different subframe patterns may be configured for neighbouring cells, such that subframes bearing the STRS between neighbouring cells will not be the same, thereby avoiding interference caused by the STRS at the neighbouring cell edge. For example, cell A and cell B are neighbouring, then the base station configures for cell A that the STRS period is 5 ms, and notifies that the initial subframe in the radio frame is #0 (in this example, it is assumed to use the first method of this embodiment), then the subframes bearing the STRS in cell A are #0 and #5 , and this is the same in each radio frame. The base station configures for cell B that the STRS period is 5 ms, and notifies that the initial subframe in the radio frame is #2 , then the subframes bearing the STRS in cell B are #2 and #7 , such that cells A and B use different subframes to transmit the STRS, thereby avoiding the appearance of the STRS in the same subframe, and avoiding the interference caused by the STRS.

On the basis of the solution in this embodiment, at the base station side, when the base station confirms that the STRS is transmitted in the new carrier, the base station configures specific information in signalling for configuring the subframe pattern above in the new carrier or the parameter describing the initial subframe position, and at the same time, the base station configures to transmit the PSS/SSS in the new carrier. When the base station confirms that the STRS is not transmitted in the new carrier, the base station configures as null in the signalling for configuring the subframe pattern above in the new carrier or the parameter describing the initial subframe position, i.e. the base station does not transmit the parameter, and at the same time, the base station does not configure to transmit the PSS/SSS in the new carrier.

As regards the subframe pattern method, in order to further reduce signalling exchange between the base station and the UE side, a fixed subframe method may be used, e.g. the STRS period is fixed, and furthermore, the base station and the UE appoint that the subframes bearing the STRS is also fixed, such that there is no need for signalling notification. For example, one of the subframe patterns above may be selected as a fixed subframe pattern bearing the STRS, which may also be permissible.

In this embodiment, the method and signalling above are used for STRS subframe determination. The base station and the UE may also appoint to introduce independent signalling for the PSS/SSS configuration situation of the new carrier rather than being implied in the STRS signalling above. For example, a piece of signalling is added for indicating the UE whether the PSS/SSS is configured in the new carrier.

In this embodiment, by means of the STRS subframe pattern signalling above, the UE is not only notified of STRS subframe configuration information in the carrier, but the UE is also implicitly notified of the following information: when the UE receives the subframe pattern signalling above, the UE considers that the PSS/SSS is transmitted in the carrier bearing the STRS, and at the same time, learns that the UE itself is not synchronous with the carrier bearing the STRS and needs to receive the PSS/SSS from the carrier bearing the STRS and accomplish the synchronization therewith, thereby excluding the possibility that the UE misconsiders that the UE itself is synchronous with the carrier bearing the STRS, and enabling the UE to clear its flow. When the subframe pattern signalling above received by the UE is null, i.e. it is not transmitted, the UE considers that the PSS/SSS is not configured in the carrier corresponding to the subframe pattern signalling, and the UE and the carrier are synchronous, and there is no more need to execute the synchronization process.

It can be seen from the description above that the technical solution of this embodiment may enable the STRS configuration flexibility to improve significantly, and achieve subframe pattern variety in the radio frame in the carrier of the STRS, and thus by applying different patterns between neighbouring cells, the subframes configured with the STRS at the edge of neighbouring cells will not be the same, thereby avoiding the interference caused by the STRS with each other. In the meantime, an implication method is used to indirectly notify the UE whether the PSS/SSS exists in the carrier, which does not only reduce signalling overhead, but also helps the UE to clear configuration information in the carrier, thereby further enabling the UE to be able to execute according to a unique flow, and reducing the complexity at the UE side.

Apparently, those skilled in the art shall understand that the above components and steps of the disclosure can be realized by using general purpose computing system, can be integrated in one computing system or distributed on a network which consists of a plurality of computing systems, and alternatively they can be realized by using the executable program code of the computing system, so that consequently they can be stored in the storage system and executed by the computing system, in some cases, can perform the shown or described step in sequence other than herein, or they are made into integrated circuit component respectively, or a plurality of components or steps thereof are made into one integrated circuit component. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the principle of the disclosure shall all fall within the protection scope as defined by the appended claims of the disclosure.

What is claimed is:

1. A synchronization track reference signal transmission processing method in a system with at least a base station and a user equipment (UE), the method comprising:
  configuring by the base station, for a new carrier, subframe pattern information used for a synchronization track reference signal (STRS), wherein the subframe pattern information is used for describing at least one subframe for transmitting the STRS in a radio frame and describing whether a primary synchronization signal (PSS) and/or a secondary synchronization signal (SSS) is transmitted in the new carrier; and
  transmitting, by the base station, the configured subframe pattern information to the UE;
  wherein the base station transmitting the configured subframe pattern information to the UE comprises: transmitting, by the base station, designated signaling to the UE via a paired compatible carrier of the new carrier, wherein the designated signaling carries the subframe pattern information;
  wherein, the new carrier is not backward compatible with UEs not supporting multi-carrier aggregation and the paired compatible carrier is backward compatible with UEs not supporting multi-carrier aggregation;
  wherein after the base station transmits the configured subframe pattern information to UE, the method further comprises:
    when the UE determines that the subframe pattern information is null, judging, by the UE, that no primary synchronization signal (PSS) and secondary synchronization signal (SSS) are transmitted in the new carrier, and determining, by the UE, that the new carrier and the compatible carrier are synchronous in time and frequency; and
    when the UE determines that the subframe pattern information is non-null, judging, by the UE, that the PSS/SSS is transmitted in the new carrier, and receiving, by the UE, the PSS/SSS in the new carrier and performing, by the UE, synchronization with the new carrier based on the PSS/SSS.

2. The method according to claim 1, wherein the subframe pattern information comprises one of the following: an initial subframe offset of the at least one subframe for transmitting the STRS in the radio frame, a subframe pattern combination of at least one subframe for bearing the STRS, and subframe identification corresponding to the at least one subframe for bearing the STRS in the radio frame, wherein the initial subframe offset comprises one of the following forms: a serial number of an initial subframe for bearing the STRS in a radio frame, and an offset from a first subframe spacing forward by a pre-determined number of subframes in the radio frame; a value range of the initial subframe offset is 0, 1, 2, 3 and 4, or a value set of the initial subframe offset is a value set composed of one or more of 0, 1, 2, 3 and 4.

3. The method according to claim 2, wherein when the base station transmits the configured subframe pattern information to the UE, the method further comprises:
when the subframe pattern information is the initial subframe offset, the base station and the UE using a pre-appointed fixed period to transmit the STRS, wherein when the fixed period is 10 ms, transmitting the configured subframe pattern information to the UE comprises: transmitting the subframe identification to the UE.

4. The method according to claim 2, wherein the subframe pattern information is one of the following: a combination of subframes #0 and #5 bearing the STRS; a combination of subframes #1 and #6 bearing the STRS; a combination of subframes #2 and #7 bearing the STRS; a combination of subframes #3 and #8 bearing the STRS; and a combination of subframes #4 and #9 bearing the STRS.

5. The method according to claim 2, wherein in a time-division duplex (TDD) mode, the subframe pattern information is determined by the following means:
determining an uplink-downlink configuration used by the new carrier; and
determining the subframe pattern information for transmitting the STRS in the uplink-downlink configuration from a plurality of pre-defined subframe pattern combinations according to pre-set rules, wherein the pre-set rules comprise:
when the uplink-downlink configuration is 0, the subframe combination bearing the STRS being subframe#0 and subframe#5, or subframe#1 and subframe#6; when the uplink-downlink configuration is 1, the subframe combination bearing the STRS being subframe#0 and subframe#5, or subframe#1 and subframe#6, or subframe#4 and subframe#9; when the uplink-downlink configuration is 2, the subframe combination bearing the STRS being subframe#0 and subframe#5, or subframe#1 and subframe#6, or subframe#3 and subframe#8, or subframe#4 and subframe#9, or subframe#0, subframe#3, subframe#6 and subframe#9; when the uplink-downlink configuration is 3, the subframe combination bearing the STRS being subframe#0 and subframe#5, or subframe#2 and subframe#6; when the uplink-downlink configuration is 4, the subframe combination bearing the STRS being subframe#0 and subframe#5, or subframe#2 and subframe#6, or subframe#4 and subframe#9; when the uplink-downlink configuration is 5, the subframe combination bearing the STRS being subframe#0 and subframe#5, or subframe#2 and subframe#6, or subframe#3 and subframe#8, or subframe#4 and subframe#9; and when the uplink-downlink configuration is 6, the subframe combination bearing the STRS being subframe#0 and subframe#5, or subframe#2 and subframe#6.

6. The method according to claim 2, wherein in a TDD mode, the value range or value set is determined using an uplink-downlink configuration of the new carrier:
when the uplink-downlink configuration is 0, the value range being 0 and 1, or the value set being a set composed of one or more of 0 and 1;
when the uplink-downlink configuration is 1, the value range being 0, 1 and 4, or the value set being a set composed of one or more of 0, 1 and 4;
when the uplink-downlink configuration is 2, the value range being 0, 1, 3 and 4, or the value set being a set composed of one or more of 0, 1, 3 and 4;
when the uplink-downlink configuration is 3, the value range being 0 and 1, or the value set being a set composed of one or more of 0 and 1;
when the uplink-downlink configuration is 4, the value range being 0, 1 and 4, or the value set being a set composed of one or more of 0, 1 and 4;
when the uplink-downlink configuration is 5, the value range being 0, 1, 3 and 4, or the value set being a set composed of one or more of 0, 1, 3 and 4; and
when the uplink-downlink configuration is 6, the value range being 0 and 1, or the value set being a set composed of one or more of 0 and 1;
wherein 0, 1, 3 and 4 respectively represent the first, second, fourth and fifth subframe in the radio frame, and corresponding subframe numbers are #0, #1, #3 and #4 respectively.

7. The method according to claim 2, wherein the value of the initial subframe offset is equal to a remainder after dividing a subframe number by the fixed period, wherein the fixed period is a fixed period used for transmitting the STRS and pre-appointed by the base station and the UE.

8. The method according to claim 2, wherein when the subframe pattern combination is identified by an index number, the base station transmitting the configured subframe pattern information to the UE comprises:
the base station transmitting the index number to the UE.

9. The method according to claim 2, wherein the base station transmitting the designated signalling to the UE via the paired compatible carrier of the new carrier comprises:
the base station transmitting an RRCConnectionReconfiguration message or measConfig message to the UE via the paired compatible carrier of the new carrier, wherein the RRCConnectionReconfiguration message or measConfig message carries the designated signalling.

10. The method according to claim 2, wherein before the base station transmits the acquired subframe pattern information to the UE, the method further comprises:
configuring the subframe pattern information in radio frames of the new carrier.

11. The method according to claim 1, wherein before the base station acquires the subframe pattern information about the STRS in the radio frame, the method further comprises:
when configuring the STRS for neighbouring cells, configuring different subframe pattern information for respective cells which are neighbouring cells with each other.

12. A synchronization track reference signal receiving processing method, comprising:
receiving, by a user equipment (UE), subframe pattern information over a first carrier from a base station, wherein the first carrier is a paired compatible carrier of a second carrier, and
determining at least one transmission subframe of a synchronization track reference signal (STRS) in the second carrier according to the subframe pattern information, wherein the subframe pattern information is configured by the base station, for the second carrier and used for describing at least one subframe for transmitting the STRS in a radio frame and describing whether a primary synchronization signal (PSS) and/or a secondary synchronization signal (SSS) is transmitted in the second carrier, and the first carrier is backward compatible with UEs not supporting multi-carrier aggregation and the second carrier is not backward compatible with UEs not supporting multi-carrier aqgregation;

wherein after the UE receives the subframe pattern information, the method further comprises:

when the UE determines that the subframe pattern information is null, judging, by the UE, that no primary synchronization signal (PSS) and secondary synchronization signal (SSS) are transmitted in the second carrier, and determining, by the UE, that the second carrier and the first carrier are synchronous in time and frequency; and when the UE determines that the subframe pattern information is non-null, judging, by the UE, that the PSS/SSS is transmitted in the second carrier, and receiving, by the UE, the PSS/SSS in the second carrier and performing, by the UE, synchronization with the second carrier based on the PSS/SSS.

13. The method according to claim 12, wherein when the first carrier and the second carrier are different, the first carrier is a paired carrier of the second carrier, wherein the first carrier is a backward compatible carrier, and the second carrier is a new carrier.

14. The method according to claim 12, wherein the subframe pattern information comprises one of the following: an initial subframe offset of the at least one subframe for transmitting the STRS in the radio frame, a subframe pattern combination of at least one subframe for bearing the STRS, and subframe identification corresponding to the at least one subframe for bearing the STRS in a radio frame;

wherein the subframe pattern combination comprises one of the following subframe combinations bearing the STRS: a combination of subframes #0 and #5; a combination of #1 and #6; a combination of subframes #2 and #7; a combination of subframes #3 and #8; and a combination of subframes #4 and #9;

the initial subframe offset comprises one of the following forms: a serial number of an initial subframe for bearing the STRS in the radio frame, and an offset from a first subframe spacing forward by a pre-determined number of subframes in the radio frame;

a value range of the initial subframe offset is 0, 1, 2, 3 and 4, or the value set of the initial subframe offset is a value set composed of one or more of 0, 1, 2, 3 and 4, wherein in a TDD mode, the UE determines the value range or value set using an uplink-downlink configuration of the second carrier: when the uplink-downlink configuration is 0, the value range being 0 and 1, or the value set being a set composed of one or more of 0 and 1; when the uplink-downlink configuration is 1, the value range being 0, 1 and 4, or the value set being a set composed of one or more of 0, 1 and 4; when the uplink-downlink configuration is 2, the value range being 0, 1, 3 and 4, or the value set being a set composed of one or more of 0, 1, 3 and 4; when the uplink-downlink configuration is 3, the value range being 0 and 1, or the value set being a set composed of one or more of 0 and 1; when the uplink-downlink configuration is 4, the value range being 0, 1 and 4, or the value set being a set composed of one or more of 0, 1 and 4; when the uplink-downlink configuration is 5, the value range being 0, 1, 3 and 4, or the value set being a set composed of one or more of 0, 1, 3 and 4; and when the uplink-downlink configuration is 6, the value range being 0 and 1, or the value set being a set composed of one or more of 0 and 1; wherein 0, 1, 3 and 4 respectively represent the first, second, fourth and fifth subframe in the radio frame, and corresponding subframe numbers are #0, #1, #3 and #4.

15. The method according to claim 12, wherein when the UE receives the subframe pattern information, the method further comprises:

when the subframe pattern information is the initial subframe offset, the UE and the base station using a pre-appointed fixed period to transmit the STRS.

16. The method according to claim 14, wherein in the time-division duplex (TDD) mode, the subframe pattern combination is determined by the following means:

determining an uplink-downlink configuration used by the second carrier; and determining the subframe pattern combination for transmitting the STRS in the uplink-downlink configuration from a plurality of pre-defined subframe pattern combinations according to pre-set rules;

wherein the pre-set rules comprise:

when the uplink-downlink configuration is 0, the subframe combination bearing the STRS comprising: subframe#0 and subframe#5, or subframe#1 and subframe#6;

when the uplink-downlink configuration is 1, the subframe combination bearing the STRS comprising one of the following: subframe#0 and subframe#5, subframe#1 and subframe#6, and subframe#4 and subframe#9;

when the uplink-downlink configuration is 2, the subframe combination bearing the STRS comprising one of the following: subframe#0 and subframe#5, subframe#1 and subframe#6, subframe#3 and subframe#8, subframe#4 and subframe#9, and subframe#0, subframe#3, subframe#6 and subframe#9;

when the uplink-downlink configuration is 3, the subframe combination bearing the STRS comprising one of the following: subframe#0 and subframe#5, and subframe#2 and subframe#6;

when the uplink-downlink configuration is 4, the subframe combination bearing the STRS comprising one of the following: subframe#0 and subframe#5, subframe#2 and subframe#6, and subframe#4 and subframe#9;

when the uplink-downlink configuration is 5, the subframe combination bearing the STRS comprising one of the following: subframe#0 and subframe#5, subframe#2 and subframe#6, subframe#3 and subframe#8, and subframe#4 and subframe#9; and when the uplink-downlink configuration is 6, the subframe combination bearing the STRS comprising one of the following: subframe#0 and subframe#5, and subframe#2 and subframe#6.

17. The method according to claim 15, wherein the fixed period comprises: 2 ms or 3 ms or 5 ms, or 2 ms and 3 ms appeared alternately.

18. The method according to claim 14, wherein the value of the initial subframe offset is equal to a remainder after dividing a subframe number by the fixed period, wherein the fixed period is a fixed period used for transmitting the STRS pre-appointed by the base station and the UE.

19. A synchronization track reference signal receiving processing apparatus, wherein the apparatus is located in user equipment (UE) and configured to:

receive subframe pattern information over a first carrier from a base station, wherein the first carrier is a paired compatible carrier of a second carrier, and determine at least one transmission subframe of a synchronization track reference signal (STRS) in the second carrier according to the subframe pattern information;

wherein the subframe pattern information is configured by the base station for the second carrier and used for describing at least one subframe for transmitting the STRS in a radio frame and describing whether a primary synchronization signal (PSS) and/or a secondary synchronization signal (SSS) is transmitted in the second carrier, the second carrier is not backward compatible with UEs not supporting multi-carrier aggregation, and the first carrier is backward compatible with UEs not supporting multi-carrier aggregation; and wherein after the receiving the subframe pattern information, the UE is further configured to:

judge, when the UE determines that the subframe pattern information is null, that no primary synchronization signal (PSS) and secondary synchronization signal (SSS) are transmitted in the second carrier, and determine that the second carrier and the first carrier are synchronous in time and frequency; and judge, when the UE determines that the subframe pattern information is null, that the PSS/SSS is transmitted in the second carrier, and receive the PSS/SSS in the second carrier when the UE determines that the subframe pattern information is non-null, and perform synchronization with the second carrier based on the PSS/SSS.

* * * * *